(12) United States Patent
Candela Canales

(10) Patent No.: US 9,863,141 B2
(45) Date of Patent: Jan. 9, 2018

(54) STRUCTURAL TENT AND ASSEMBLY METHOD

(71) Applicant: Vicente Manuel Candela Canales, Valencia (ES)

(72) Inventor: Vicente Manuel Candela Canales, Valencia (ES)

(*) Notice: Subject to any disclaimer, the term of this patent is extended or adjusted under 35 U.S.C. 154(b) by 0 days.

(21) Appl. No.: 15/515,674

(22) PCT Filed: Oct. 14, 2015

(86) PCT No.: PCT/ES2015/070747
§ 371 (c)(1),
(2) Date: Mar. 30, 2017

(87) PCT Pub. No.: WO2016/062908
PCT Pub. Date: Apr. 28, 2016

(65) Prior Publication Data
US 2017/0298619 A1    Oct. 19, 2017

(30) Foreign Application Priority Data
Oct. 20, 2014   (ES) .................................. 201431544

(51) Int. Cl.
*E04H 15/42* (2006.01)
*E04H 15/54* (2006.01)
(Continued)

(52) U.S. Cl.
CPC .......... *E04B 2/562* (2013.01); *E04B 1/34321* (2013.01); *E04B 1/34326* (2013.01);
(Continued)

(58) Field of Classification Search
CPC ......... E04H 15/42; E04H 15/54; E04B 2/562; E04B 1/7654; E04F 13/002
See application file for complete search history.

(56) References Cited

U.S. PATENT DOCUMENTS 707,347 A      8/1902   Nelson
3,909,992 A  * 10/1975  Stachiw .................. E04B 1/169
                                                  135/115
(Continued)

FOREIGN PATENT DOCUMENTS

DE    3345255 A1    7/1984
FR    2399511 A1    3/1979
FR    2570730 A1    3/1986

OTHER PUBLICATIONS

English Translation of the Written Opinion for PCT/ES2015/070747 prepared on Mar. 6, 2017 (5 pages).*

(Continued)

*Primary Examiner* — Rodney Mintz
(74) *Attorney, Agent, or Firm* — Brown & Michaels, PC

(57) ABSTRACT

A structural tent intended for use as a living space able to withstand extreme temperatures, while still being comfortable and used on a temporary basis; comprising a frame on which there are assembled first profiles and lower posts which are attached to a plurality of second profiles, brackets and upper posts, which form the structure on which a ridgepole is supported; and where a filler material is introduced into the gap created between the frame and the outside fabric; and where, finally, the ridgepole is integrally supported on the upper posts, where honeycomb plates are supported, an impermeable roof being arranged on the honeycomb plates and the gaps in the honeycomb plates being filled with a fine granular material.

10 Claims, 1 Drawing Sheet

(51) Int. Cl.
*E04B 2/56* (2006.01)
*E04B 1/343* (2006.01)
*E04B 7/20* (2006.01)
*E04B 1/76* (2006.01)
*E04F 13/00* (2006.01)
*E04H 1/12* (2006.01)
*E04H 9/16* (2006.01)
*E04H 9/14* (2006.01)

(52) U.S. Cl.
CPC .............. *E04B 1/7654* (2013.01); *E04B 7/20* (2013.01); *E04F 13/002* (2013.01); *E04H 1/1205* (2013.01); *E04B 2001/34389* (2013.01); *E04H 9/145* (2013.01); *E04H 9/16* (2013.01)

(56) References Cited

U.S. PATENT DOCUMENTS

| | | | |
|---|---|---|---|
| 4,102,352 A | 7/1978 | Kirkham | |
| 6,253,777 B1 * | 7/2001 | Anderson | E04H 15/54 135/115 |
| 6,918,212 B1 * | 7/2005 | Anderson, Sr. | B44C 5/04 52/238.1 |
| 7,299,595 B1 * | 11/2007 | Anderson, Sr. | B44C 5/04 52/282.1 |
| 7,882,849 B2 * | 2/2011 | Franta | E04H 15/001 135/115 |
| 8,104,233 B2 * | 1/2012 | Wilsey | E04B 1/161 52/411 |
| 8,997,767 B2 * | 4/2015 | Hotes | E04H 9/16 135/115 |
| 9,057,207 B1 * | 6/2015 | Prendergast | E04H 15/14 |
| 9,340,994 B2 * | 5/2016 | Hotes | E04H 15/36 |
| 2006/0277837 A1 * | 12/2006 | Wilsey | E04B 1/161 52/79.1 |
| 2010/0319285 A1 | 12/2010 | Jewett et al. | |
| 2013/0074894 A1 * | 3/2013 | Cook | E04H 15/54 135/96 |
| 2013/0104947 A1 * | 5/2013 | Hotes | E04H 9/16 135/96 |
| 2014/0060599 A1 * | 3/2014 | Hotes | E04H 15/36 135/91 |

OTHER PUBLICATIONS

International Search Report for PCT/ES2015/070747 dated Jan. 13, 2016.

* cited by examiner

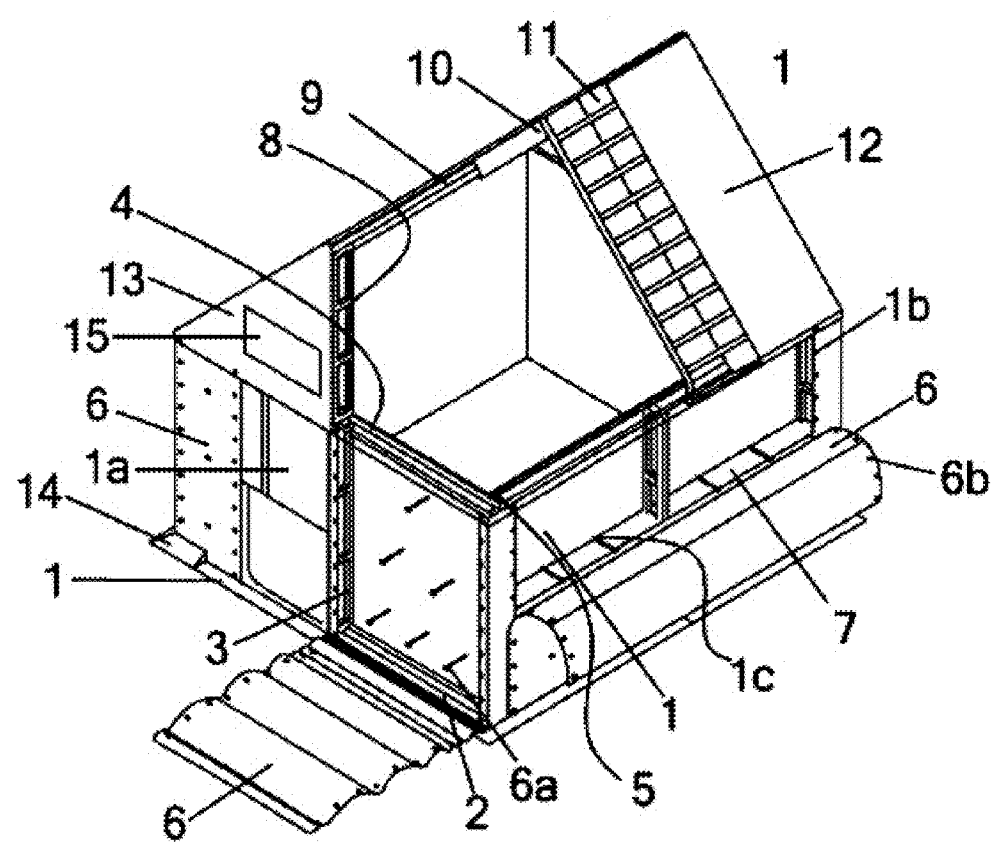

STRUCTURAL TENT AND ASSEMBLY METHOD

OBJECT OF THE INVENTION

The object of the present invention is a structural tent, the main feature of which is based on incorporating enhanced thermal insulation and greater resistance to wind, fire, water and impacts than what known tents incorporate today.

PRIOR ART

From time immemorial, the construction and design of edifications was based on the concept of using closure and structural or resistant elements, that are together capable of efficiently withstanding inclement weather. This constructive method used load-bearing walls as the central element, assuring the required stability for the construction.

After that construction gradually changed in essence until the resistant or structural and closure elements were made independent of one another, thereby achieving a number of advantages. In both architecture and in engineering today, edifications are designed by making, on one hand, the elements intended for withstanding loads (resistant structure) and, on the other, the parts making up the curtain wall of the building completely independent of one another.

This constructive model or method is used in the design and manufacture of tents, using, on one hand, lightweight structures to transmit loads from the tent to the ground (usually made of metal, plastic or carbon fiber), and on the other hand, the closure elements (preferably being cloths or plastics), appropriately secured to the structural elements to achieve the stability, closure and insulation with respect to the outside.

Today, rapidly assembled and disassembled tents, which are designed to provisionally be a living space in non-urban areas, have the serious problem of lacking thermal and acoustic insulation.

This means that in those areas where the temperatures experience extreme night/day variations, or in areas where the critical conditions are determined by the climate that is characteristic of the area, the comfort of the living space created in the tent is deficient, failing to provide minimal comfort features to those people living in said tents, and this aspect is particularly important in people who are more prone to suffer from said inclemencies, such as, children, the elderly, the sick, etc.

In the same way, the construction of systems today is based on using plastic cloths, with extremely expensive artificial insulations or creating an intermediate area between two layers, forming air chambers that seek to produce the effect of thermal insulation, but said systems do not solve the problems associated with the site in areas with extreme climates.

DISCLOSURE OF THE INVENTION

The technical problem solved by the present invention is to obtain a commonly used tent which achieves creating a living space able to withstand extreme temperatures, while still being comfortable and used on a temporary basis. To that end, the structural tent, object of the present invention, is characterized in that it comprises a base or frame, incorporating both the inner walls and the floor into one piece. There are assembled on said frame a plurality of profiles and lower posts, integrally attached to a plurality of second profiles and upper posts, in charge of forming the structure on which the ridgepole of the tent will be supported.

A filler material is introduced in the gap created between the frame and the permeable outer cloth that will protect the contents of the tent from any possible thermal changes occurring outside same; both the inner and outer cloths are the structural elements that will withstand the loads transmitted by the filler, and both cloths are furthermore attached by a plurality of turnbuckles and buttons; the ridgepole is made by means of a profile integrally attached to a plurality of upper posts, associated with a number of plates with an honeycomb structure, the gaps in the outer face thereof being filled manually by means of a fine granular material, forming the leak-tight structure of the ridgepole on which an impermeable roof made of cloth or the like is securely arranged.

As a result of its especial design, the resistance to loads and the transmission thereof to the ground will be done by means of the closure cloths, similarly to load-bearing walls, since the cloths act like the resistant structure of the filler material, such as, for example, sand, gravel or fine aggregates, soil (free of any sharp elements), snow, plant waste (free of any sharp elements) or inert materials, free of any toxic substances and/or sharp elements.

Therefore, the design of the tent herein proposed is based on using filler materials which can be found in camping areas, such that said material acts as an insulating material.

The structural resistance to loads is achieved as a result of the cloths of the curtain wall, and to a lesser extent the auxiliary assembly parts (posts, brackets and profiles).

It should be pointed out that the proposed construction is comprised in the field of tents that are easy to manually assemble and disassemble, lightweight so that they can be transported by human means and low cost, being able to use said tents as an exceptional housing solution, with the particularity that it incorporates high thermal insulation as a result of the fact that the closure cloths work as a load-resistant structure. The tent will be particularly useful in refugee and military camps in sandy deserts.

Likewise, as a result of its design the user of the tent herein disclosed will have guaranteed thermal, acoustic and visual isolation from the outside, all as a consequence of using a raw material that is abundant in the surrounding area, making the assembly and insulation thereof easier in the matter of a short time.

This in turn means that the assembly structures are very lightweight and economical since they must only withstand the weight of the cloths during assembly. It is likewise resistant to gusts of wind, external blows and/or attacks, and is likewise an optimal solution for hanging elements both inside and outside, such as, for example, lighting, food, utensils, clothing, etc.

Conventional guy wires or turnbuckles are eliminated, making it further susceptible to being handled on the outside and to preventing accidents with the guy wires, and in turn, since the tent will take up less space, better use is made of the surface (which is particularly useful in refugee or military camps for example).

The tent could be assembled on any type of surface, whether it is hard (rock, pavements) or soft and deformable.

The tent will be resistant to water surface currents, since the weight of the walls will allow resisting the thrust exerted by water in the event of flash flooding.

In turn, the tent herein proposed will exhibit greater resistance to fire, since in the event of a fire, when permeable outside fabric burns aggregates will pour out, which will limit or prevent the spread of the fire, and in turn the auxiliary assembly structure and the inside impermeable cloth will prevent the tent from collapsing and subsequent bodily harm.

Finally, if water is added to the filler material of the walls and roof, temperature will decrease in those cases in which temperatures are very high since the evaporation process is an endothermic process that absorbs heat, and in the event of temperatures being low, when water is added in liquid state, temperature will increase since water going from liquid to solid is an exothermic process that gives off heat. Furthermore, a physical barrier whereby insulation is increased is created.

Throughout the description and the claims the word "comprises" and variants thereof do not mean to exclude other technical features, additions, components or steps. For those skilled in the art, other objects, advantages and features of the invention will be deduced in part from the description and in part from putting the invention into practice. The following examples and drawings are provided by way of illustration, and are not meant to restrict the present invention. Furthermore, the present invention covers all the possible combinations of particular and preferred embodiments herein indicated.

BRIEF DESCRIPTION OF THE DRAWINGS

A drawing that helps to better understand the invention and expressly relates to an embodiment of said invention is very briefly described below as a non-limiting example of the invention.

FIG. 1 shows a schematic view of the structural tent object of the present invention.

PREFERRED EMBODIMENT OF THE INVENTION

The attached drawing shows a preferred embodiment of the invention. More specifically, the structural tent object of the present specification is characterized in that it comprises an inside base frame (1), incorporating the inner walls and the floor into one piece of fabric, along with an inner door (1a) for entering the tent.

A plurality of first profiles (2) and lower posts (3) are assembled on said frame (1), integrally attached to a plurality of second profiles (4) and upper posts (8) and, together with the brackets (5) in the corners thereof, they will be in charge of forming the structure on which the ridgepole (9) of the tent will be supported.

A permeable outside fabric (6) is secured to the frame (1) as a result of a plurality of turnbuckles (6a) and eyelets (6b) coinciding with buttons (1b) in the frame (1), forming a gap (1c) where a filler material (7) will be arranged, the function of which will be to protect the contents of the tent against possible thermal changes occurring outside said tent.

The upper part of the tent or ridgepole is made by means of a T-shaped profile (9), integrally attached to a plurality of upper posts (8), associated with a number of plates (10) with an honeycomb structure made from a self-supporting plastic material, the gaps in the outer face thereof being filled by means of a fine granular material (11), forming the leak-tight structure of the ridgepole (9) on which an impermeable roof (12) made of cloth or the like is securely arranged.

Finally, cloths with thermal insulation (13) having an essentially triangular shape are arranged in the front part of the tent, provided with at least one transparent window (15).

In a preferred embodiment, reinforcement strips (14) will be arranged on the outer part of the tent, securing the attachment with the base (1), such that the mentioned base (1), and hence the tent as a whole, is better fixed to the ground.

In a first practical embodiment, the tent will have inner dimensions between 1.80 and 2.40 meters wide and between 2.30 and 4 meters long, giving it a certain inner capacity that can be utilized by three to six people.

In a second practical embodiment, the tent will have inner dimensions between 1.80 and 2.40 meters wide and between 4 and 10 meters long, giving it a certain inner capacity that can be utilized by 6 to 12 people.

In a third practical embodiment, for tents for housing multiple families, the ridgepole (9) will be formed by means of a structure curved in the form of an arch, using plastic, metal or wood materials.

The assembly of the tent herein disclosed will be divided into different steps, so in a first step the frame (1) forming the inner walls and floor. Then in a second step, assembly structures formed by means of the profiles (2, 4), lower posts (3) and brackets (5) in the corners will be arranged to lift and hold the inside cloth of the frame (1), and thereby make installation easier by means of manually pouring the filler (7). Then the remaining assembly parts will be arranged to complete the support structure.

In a third step, the outside cloths (6) are arranged, being secured to the frame (1) by means of buttons (1b) and turnbuckles (6a). A relatively small gap (1c) being formed between both cloths such that can readily be filled manually.

As the walls are being filled in and the height thereof increases, the outside fabric (6) will be secured to the inside cloth of the frame (1) by means of a plurality of fixing and/or tension elements (6a) and buttons (1b). Likewise, the outside cloths (6) and the frame (1) will be secured to the previously defined upper profiles (4).

Finally, in a fourth step the T-shaped ridgepole (9) is assembled, and this is done by supporting it on the upper posts (8) which will transmit the loads to the lower posts (3).

Then a plurality of plates (10) with an honeycomb structure will be arranged, and once the plates forming the roof are arranged, they will be filled with a fine granular material (11) using a shovel or the like, filling in the gaps thereof, allowing the excess material to fall to prevent excess weight on the roof.

Finally, an impermeable cloth (12) will be arranged on the roof consisting of plates (10) to prevent the rain from causing an excess weight and the entrainment of fines.

What is claimed is:

1. A structural tent, comprising:
an inside base frame, comprising a plurality of inner walls and a floor formed as one piece of fabric, and a plurality of turnbuckles and buttons;
a plurality of first profiles and lower posts, integrally attached to a plurality of second profiles, brackets and upper posts attached to the base frame and forming a structure of the tent;
a permeable outside fabric secured to the base frame, by the plurality of turnbuckles and buttons coupled to a plurality of eyelets through the permeable outside fabric;
a filler material housed in a gap formed between the base frame and the permeable outside fabric;
a ridgepole supported on the plurality of upper posts;
a plurality of honeycomb plates forming a roof, supported on the ridgepole, the lower posts and the second profiles, having a fine granular material filling gaps in the honeycomb plates; and an impermeable cloth roof securely arranged on said honeycomb plates.

2. The tent of claim 1, further comprising an inner door located in a lower part of a front of the tent.

3. The tent of claim 1, further comprising a plurality of reinforcement strips for securing the tent to a ground surface, arranged around an outer part of the tent.

4. The tent of claim 1 in which the plurality of honeycomb plates forming the roof are curved such that the roof forms an arch.

5. The tent of claim 1, in which the tent is between 1.80 and 2.40 meters in width and between 2.30 and 4 meters in length.

6. The of claim 1, in which the tent is between 1.80 and 2.40 meters in width and between 4 and 10 meters in length.

7. The tent of claim 1, further comprising thermal insulation arranged in a front part of the tent.

8. The tent of claim 7, wherein the thermal insulation is triangular in shape.

9. The tent of claim 8, further comprising at least one transparent window in the thermal insulation.

10. An assembly method for assembling a structural tent, comprising the steps of:

i) extending a base frame comprising one piece of fabric, forming a plurality of inner walls and a floor;
ii) arranging a plurality of first profiles and second profiles, upper posts and lower posts and corner brackets, forming a structure to lift and secure the inside cloth of the base frame;
iii) arranging outside cloths, secured only in an area of the floor;
iv) arranging a filler material in a gap between the outside cloths and the floor;
v) securing the outside cloths to the inside cloth of the base frame by means of at least one of a plurality of fixing or tension elements;
vi) securing the outside cloths to the second profiles
vii) assembling a T-shaped ridgepole on the upper posts;
viii) arranging a plurality of honeycomb plates, on the ridgepole and the second profiles to form a roof;
ix) filling gaps in the honeycomb plates with a fine granular material; and
x) arranging an impermeable cloth on the roof, preventing rain from causing the roof to collapse due to excess weight and preventing entrainment of fines.

* * * * *